United States Patent Office
3,197,436
Patented July 27, 1965

3,197,436
COORDINATION POLYMERS
Burton Peter Block, Conshohocken, Luke R. Ocone, Springfield Township, Montgomery County, and Joseph Simkin, Philadelphia, Pa., assignors to Pennsalt Chemicals Corporation, Philadelphia, Pa., a corporation of Pennsylvania
No Drawing. Filed Mar. 16, 1962, Ser. No. 180,363
18 Claims. (Cl. 260—63)

This invention relates to novel co-ordination polymers and, more particularly, is concerned with novel polymers involving a doubly bridged (catenated) trivalent octahedral metal coordinated with a bidentate ligand whereby the polymer backbone is entirely inorganic. These novel polymers, because of their high temperature stability, are useful for conversion to shaped articles and as coating compositions to be employed under high temperature conditions.

In accord with the invention there is provided a polymer having the repeating units $M(AB)X_2$ wherein M is a trivalent octahedral metal, AB is a bidentate ligand having a charge of —1 (i.e., it is a negative monovalent ion) and X is a bridging group also with a charge of —1. Alternatively, these solid polymers may be represented as compounds containing a plurality of recurring units having the structure

wherein M is the trivalent octahedral metal, AB is the bidentate ligand and X is the bridging group.

The trivalent octahedral metal may be any of the numerous metals which are characterized by having a cordination number of six in the +3 oxidation state (i.e., an octahedral spatial configuration). Such metals include chromium, cobalt, ruthenium, indium, rhodium, iridium, gallium, aluminum, thallium, iron, etc.

The bidentate ligand will be an anion with a charge of —1 capable of forming an essentially strain-free ring (i.e., a five or six-membered ring) with the octahedral metal through coordination (chelation) of two covalent bonds. Such co-ordinate covalent bonds are formed between the metal and the ligand through two functional groups, one of which provides a valence of —1, characterized structurally by the skeletal formula

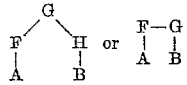

where A is a neutral donor group such as a keto oxygen or an amino group and B is a group with a charge of —1 formed by the removal of a proton from a group such as hydroxyl or an amino group. The groups F, G and H connecting the groups A and B may be composed of a combination of groups such as —CH$_2$—, —CH=, and —NH—. Examples of —F—G— and —F—G—H— groups are

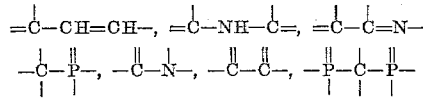

and the like. These useful ligands can be derived from 1,3-diketones, esters of 3-ketoacids, amino acids, 3-hydroxyketones, 3-amino alcohols, aminomethyl phosphinic acids, phosphinyl methyl phosphinic acids, etc. Specific compounds falling within the above classes and which are useful ligands include the anions derived from acetylacetone, alanine, picolinic acid, benzoylacetone, biguanide, ethylacetoacetate, phenylbiguanide, 8-quinolinol, etc.

The catenating or bridging groups (X in the above structure of the polymer) will also have a charge of —1 and will comprise the anion of an acid. Preferably the acid will be one having the structure $R_2M'(Y)YH$ which is based on the group of metals and metalloids of Group VB; i.e., M' is an element of Group VB having an atomic number greater than 7 (e.g., phosphorus, arsenic, antimony and bismuth) and Y is an atom selected from the group consisting of oxygen and sulfur. M' is preferably phosphorus and Y is preferably oxygen and thus the preferred bridging groups are the phosphinic acids, many of which are disclosed by Kosolapoff in his book, "Organophosphorus Compounds" (John Wiley, 1950). It is evident that for the purpose of forming the polymer backbone by bridging the metal M atoms, only three valences of each central M' atom are used. Thus the remaining valences of the central atom are satisfied with two R groups which may be the same or different inert organic groups such as alkyl, aryl, alkoxyl or aryloxy radicals or inert inorganic groups such as —NH$_2$. It is also possible to use other acid anions with a charge of —1 (such as organic carboxylic acids) which can furnish two donor sites so related that the ion must act as a catenating group, e.g.,

where R is alkyl, aryl, etc. Preferably R will be a hydrocarbon alkyl or aryl group containing from one to ten carbon atoms, as, for example, methyl, ethyl, t-butyl, hexyl, octyl, phenyl, tolyl, xylyl, naphthyl and the like. It will also be understood that the two bridging groups need not be the same.

Specific examples of the polymers of this invention include those having the following repeating units:

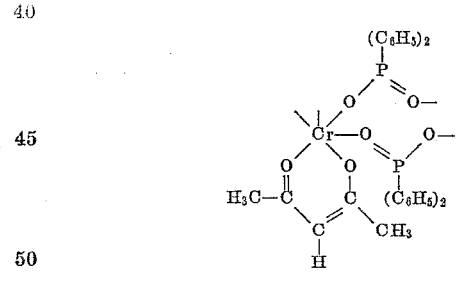

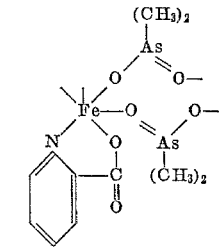

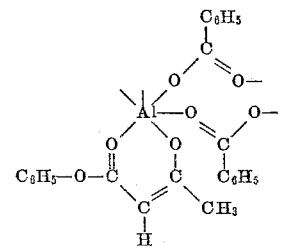

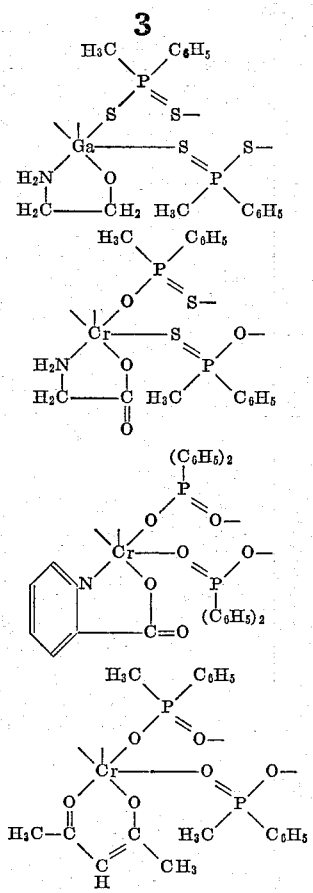

The novel polymers of this invention are solids which decompose without melting at temperatures of about 300° C. and higher, depending upon the particular polymer. The polymers, which are generally obtained as mixtures of various molecular weights, can be fractionated into various molecular weight ranges by the use of organic solvents as described in the examples. These polymers include the organic solvent soluble dimeric product and other soluble products having molecular weights up to about 10,000. Also embodied in this invention are the organic solvent insoluble polymers having much higher molecular weight ranges. In general, the number of polymeric units (n) which are present in any one polymer will range from 2 to about 20 for the soluble polymers and n will, of course, be higher for the insoluble polymeric products.

It is well known that certain octahedral coordination compounds possess polymeric structures characterized by double-bridging between metal atoms, for example, $Co(C_5H_5N)_2Cl_2$ and $Cd[OC(NH_2)_2]_2Cl_2$ having the structures:

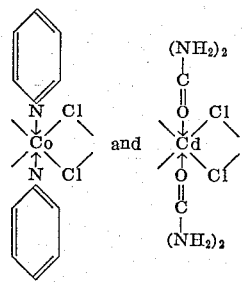

In all such cases, however, the double-bridged backbone of the polymer is a rod, which is the result of the more stable trans configuration permitted by the monodentate ligand. The novel polymers of this invention have a completely different structure from such known polymers because of the presence of the bidentate ligand which, as shown above, is absent in the prior art compounds. The bidentate ligand, perforce, occupies two positions of the coordination octahedron next to one another in space, i.e., cis positions. The remaining four positions which are used for the double-bridging are thus so related to one another that the polymer backbone is not a rigid rod, but instead forms a spiral. This confers some flexibility on the backbone, leading to different and often more useful properties for the novel polymers of this invention. Thus, the polymers and films obtained therefrom will be somewhat elastic and flexible instead of brittle.

The high thermal stability of these polymers makes them of value for use at temperatures where ordinary organic polymers fail. Thus, they will be of particular value under high temperature conditions as gaskets, O-rings, protective coatings, and the like. Those polymers which are colored will also be of value as pigments and tints.

One process by which the polymers of this invention are prepared is quite simple. A dry mixture of the metal chelate $M(AB)_3$ and the acid HX, where AB and X are as defined above, in 1:2 molar ratio respectively, is heated in an inert atmosphere (e.g., nitrogen, argon, etc.) at a temperature sufficient to volatilize HAB. When HAB is no longer evolved, the cooled product may be divided into fractions of different molecular weights by successive extraction with suitable solvents such as alcohols, aromatic hydrocarbons and halogenated hydrocarbons. Within limits, higher temperatures in the process lead to the formation of more of the higher molecular weight products. An alternative method of preparation is to heat the mixture of reactants in a high boiling liquid such as biphenyl, chlorinated biphenyls, or any other suitable solvent, whereby volatile by-products are distilled from the reaction system and the polymeric product is simply separated from the liquid by decantation, filtration, or centrifugation. In both of these processes the chelate $M(AB)_3$ may be replaced with $[M(AB)_2X]_2$ (the first member of the polymer series of this invention) in which case the molar ratio of the reactants used will be 1:2. Still another method of preparation that can be used is to replace the AB ligand in $[M(AB)X_2]_n$ with another AB ligand which has a less volatile protonated form by treating the polymer fraction with the protonated form of the second AB ligand either in a fusion reaction or in a solvent with a sufficiently high boiling point so that the protonated form of the original AB ligand is volatilized. For example $[Cr(CH_3COCHCOCH_3)(OP(C_6H_5)_2O)_2]_n$ may be converted to

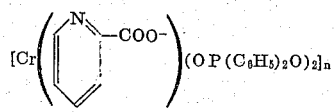

by treating the former polymer with picolinic acid and liberating acetylacetone (see Examples 14 and 17). It is also possible to prepare a mixture of higher molecular weight polymers by the thermal decomposition of the dimeric form $[M(AB)_2X]_2$ provided a sample of the dimer is maintained at the temperature at which $M(AB)_3$ starts to volatilize from it, until constant weight is attained. A still further process that is useful for the preparation of these polymers is the reaction of mixed ligand compounds of the type $M(AB)(A'B')_2$ or $M(AB)(a)_2(b)_2$, where A'B' represents a second AB ligand with a more volatile protonated form than HAB, $a$ being a neutral unidentate ligand such as pyridine and $b$ being an anion such as chloride, with HX, said reaction taking place either in a fusion reaction or in an inert solvent (see Example 10).

It will be understood that not all of the above processes may be applicable in a practical sense to a particular combination of metal chelate and acid, for certain competitive reactions might occur which would preclude obtaining any significant yield of desired polymeric product. Thus, for example, the dry fusion reaction should be avoided with metal chelates of cobalt because of its strong tendency to change its valence state at high temperatures to divalent non-octahedral cobalt. Thus, for cobalt chelates, low temperature reactions should be used. In a similar manner, certain metal chelates may preferentially react with a particular acid and little polymeric product will be obtained. Thus, a ferric iron chelate such as ferric acetylacetonate preferentially reacts with diphenyl phosphinic acid to yield mostly the iron phosphinate instead of polymer. Thus, with ferric chelates other acids such as methylphenyl phosphinic or benzoic are preferred.

Examples of the various kinds of reactants that may be used in these processes are:

M(AB)$_3$:

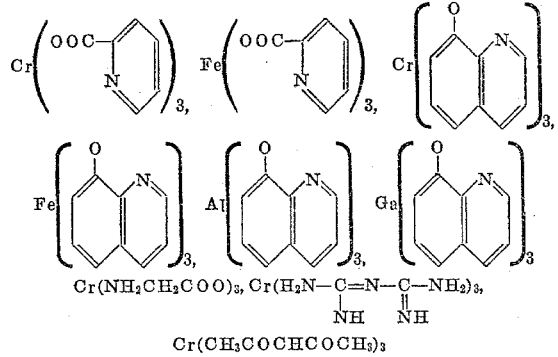

$Cr(NH_2CH_2COO)_3$, $Cr(H_2N-C=N-C-NH_2)_3$,
                                  $\underset{NH}{|}$ $\underset{NH}{\|}$ $Cr(CH_3COCHCOCH_3)_3$

[M(AB)$_2$X]$_2$:

[Cr(CH$_3$COCHCOCH$_3$)$_2$OP(C$_6$H$_5$)$_2$O]$_2$,

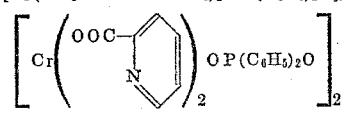

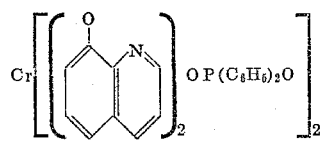

[Cr(CH$_3$COCHCOCH$_3$)$_2$OAs(CH$_3$)$_2$O]$_2$,
[Cr(CH$_3$COCHCOCH$_3$)$_2$OC(C$_6$H$_5$)O]$_2$

HX:

(C$_6$H$_5$)$_2$P(O)OH, (C$_6$H$_5$)(CH$_3$)P(O)OH, (CH$_3$)$_2$P(O)OH,
(C$_6$H$_5$)$_2$As(O)OH, (CH$_3$)$_2$As(O)OH, C$_6$H$_5$C(O)OH.

HAB:

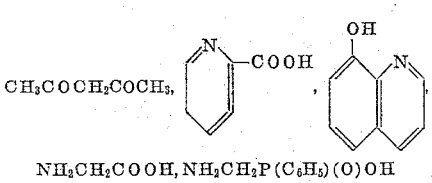

$CH_3COCH_2COCH_3$, $NH_2CH_2COOH$, $NH_2CH_2P(C_6H_5)(O)OH$

M(AB)(A'B')$_2$:

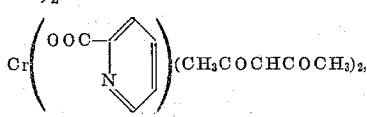

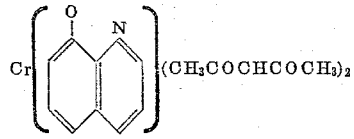

$Cr(NH_2CH_2P(C_6H_5)O_2)(CH_3COCHCOCH_3)_2$

M(AB)(a)$_2$(b)$_2$:

$Cr(CH_3COCHCOCH_3)(C_5H_5N)_2Cl_2$

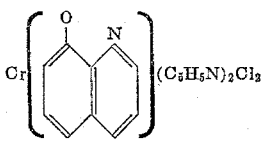

It will be obvious to one skilled in the art that there are many combinations that fit the general pattern of the novel compositions described in this invention. The examples that follow are for illustrative purposes and are not meant to limit the scope of the invention.

EXAMPLES 1 TO 6

$Cr(CH_3COCHCOCH_3)_3$ and $(C_6H_5)_2P(O)OH$ were mixed and heated under various conditions until $CH_3COCH_2COCH_3$ was no longer evolved to yield polymeric products. The following Table I illustrates the conditions used and gives the analysis of the products formed.

*Table I*

| Run | Weight (grams) Cr(CH$_3$COCHCOCH$_3$)$_3$ | Weight (grams) (C$_6$H$_5$)$_2$P(O)OH | Temp., °C. | Conditions | Work up (grams) | | | |
|---|---|---|---|---|---|---|---|---|
| | | | | | Soluble | | | Insoluble |
| | | | | | C$_2$H$_5$OH (a) | C$_6$H$_6$ (b) | CHCl$_3$ (c) | (d) |
| 1 | 24.5 | 30.5 | 175 | Solids under N$_2$ | 9.7 | 9.1 | 4.1 | 14.1 |
| 2 | 10.5 | 13.1 | 200 | do | 2.4 | 5.0 | 3.5 | 5.8 |
| 3 | 10.5 | 13.1 | 250 | do | 0.5 | 1.2 | 4.7 | 9.4 |
| 4 | 3.5 | 4.4 | 200 | In a mixture of chlorinated biphenyls (Aroclor 1254). | (A) | | | |
| 5 | 8.0 | 8.7 | 170–180 | In biphenyl | (B) | | | |
| 6 | 3.5 | 4.4 | 130–190 | Solids under N$_2$ | | | (C) | |

(A) Reaction mixture originally in solution. A precipitate formed during the reaction. The portion soluble in C$_6$H$_6$ was recovered and washed with ethanol. Yield 2.8 g.
(B) Reaction product washed with diethyl ether to give 3.3 g. soluble fraction (a) and then with CHCl$_3$ to give 3.5 g. soluble (b) and 3.3 g. insoluble (c).
(C) Reaction mixture extracted with benzene leaving 0.8 g. insoluble (a) and a soluble fraction which was split into a fraction soluble in acetone (b) and an acetone insoluble fraction (c).

Analyses:

| Calcd. for Cr(CH$_3$COCHCOCH$_3$)(OP(C$_6$H$_5$)$_2$O)$_2$ | 1b | 1c+1d | 1c | 1d | 2b | 2c, 3b | 3c | 3d | 4 | 5a | 5b | 6a | 6b | 6c |
|---|---|---|---|---|---|---|---|---|---|---|---|---|---|---|
| Cr, 8.88 | 9.4 | 8.6 | 8.5 | 8.8 | | | | 8.5 | 8.3 | 9.8 | | 8.3 | 8.1 | 8.3 |
| P, 10.58 | 9.3 | 10.8 | | 10.4 | | | | 10.4 | 11.1 | | | 11.56 | 9.69 | 11.37 |
| C, 59.49 | 58.5 | 59.6 | | | | | | | 58.6 | | | 58.9 | 58.74 | 59.49 |
| H, 4.65 | 4.9 | 4.8 | | | | | | | 4.4 | | | 4.34 | 4.82 | 4.55 |
| Mol. wt., 585.5 | 1,940 | | >2,000 | | 2,633 | >2,000 | 10,870 | | >2,000 | | 1,486 | | 814 | |

EXAMPLE 7

In order to prepare the first member of the polymer family which is the dimer:

a different molar ratio of reactants was employed. A mixture of 126.0 g. of $Cr(CH_3COCHCOCH_3)_3$ and 52.32 g. of $(C_6H_5)_2P(O)OH$ (mole ratio 1.5 to 1) was heated in a flask to 240° C. over a thirty-two minute period. When the temperature approached 200° C., a green melt was formed and vapors of $CH_3COCH_2COCH_3$ were liberated. At 240° C. evolution of the vapors was essentially complete and heating was discontinued. Elapsed time between 200° and 240° C. was eight minutes. The cooled melt was broken up and extracted with ethanol to remove any unreacted starting materials, and the green residue was recrystallized from chloroform. Found for the recrystallized product: 11.07% Cr, 56.7% C., 5.27% H, 6.5% P, mol. wt. 917. Calculated for $$Cr_2(CH_3COCHCOCH_3)_4(OP(C_6H_5)_2O)_2$$

11.13% Cr, 56.54% C, 5.16% H, 6.63% P, mol. wt. 934.8; decomp. 278–280° C.

EXAMPLE 8

A mixture of 2.7 g. of $$[Cr(CH_3COCHCOCH_3)_2(OP(C_6H_5)_2O)]_2$$

and 1.1 g. of $(C_6H_5)_2P(O)OH$ was held at 180–200° C. in biphenyl until $CH_3COCH_2COCH_3$ was no longer detected above the reaction mixture. The residue after the biphenyl was distilled off was washed with benzene to give 1.1 g. of soluble material shown by infrared to be mostly $[Cr(CH_3COCHCOCH_3)_2(OP(C_6H_5)_2O)]_2$ and 2.0 g. of an insoluble fraction which analyzed Cr, 8.0%, P, 11.1%, C, 59.7%, H, 4.4%. The chloroform soluble portion of this residue had a molecular weight of 5869.

EXAMPLE 9

A sample of $[Cr(CH_3COCHCOCH_3)_2(OP(C_6H_5)_2O)]_2$ was heated in a stream of high purity nitrogen to 272° C. and held there for about 24 hours. During this period, rapidly at first and then diminishing as heating progressed, $Cr(CH_3COCHCOCH_3)_3$ was liberated. The loss in weight corresponded approximately to that which would result from the rearrangement of the dimer and volatilization of $Cr(CH_3COCHCOCH_3)_3$:

The residue was identified by infrared spectrum as the double-bridged polymer.

EXAMPLE 10

A solution of 2.3 g. of $(C_6H_5)_2P(O)OH$ in 100 ml. of $CHCl_3$ was placed in a flask which was connected to an extractor made by sealing a glass frit into the tube which returned the refluxing solvent to the flask. A 2.0 g. sample of $Cr(CH_3COCHCOCH_3)(C_5H_5N)_2Cl_2$ was placed on the frit, and the solution was refluxed until the $$Cr(CH_3COCHCOCH_3)(C_5H_5N)_2Cl_2$$

all dissolved and was washed into the flask. The resulting $CHCl_3$ solution was then evaporated to dryness, and the residue was washed with water. After it was dried, the residue was identified by infrared analysis as identical to soluble fractions of $$[Cr(CH_3COCHCOCH_3)(OP(C_6H_5)_2O)_2]_n$$

prepared by other methods.

EXAMPLE 11

A mixture of 4 g. of

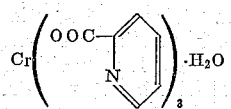

and 4 g. of $(C_6H_5)_2P(O)OH$ was heated at 180–220° C. until picolinic acid ceased to evolve. The cooled residue was washed with water and then dissolved in chloroform. The residue obtained by evaporation of the solution was then recrystallized from ethanol to give

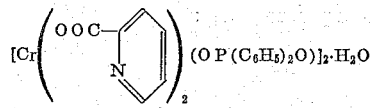

Found: 9.6% Cr, 54.4% C, 3.7% H, 5.0% N and 5.7% P; molecular weight 1057. Calculated: 9.96% Cr, 55.01% C, 3.66% H, 5.36% N, and 5.75% P; molecular weight 1045.

EXAMPLE 12

A mixture of 8 g. of

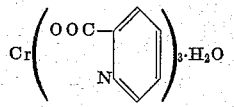

and 2 g. of $(C_6H_5)_2P(O)OH$ was heated in molten biphenyl until picolinic acid was no longer evolved. The cooled mixture was extracted with petroleum ether to remove biphenyl, dissolved in chloroform, and recovered by evaporation of the solution. Washing this product with water left a 50% yield of

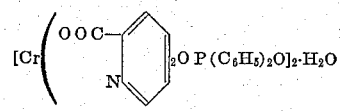

identical to that prepared in Example 11.

EXAMPLE 13

In a reaction similar to that in Example 12 a mixture of 8 g. of

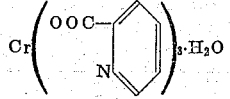

and 10 g. of $(C_6H_5)_2P(O)OH$ yields a fraction insoluble in $CHCl_3$ which is substantially

as well as the soluble fraction consisting of

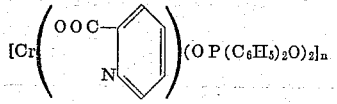

and soluble higher homologs.

EXAMPLE 14

An alternate process for the preparation of the polymer of Example 13 is to start with polymeric $$[Cr(CH_3COCHCOCH_3)(OP(C_6H_5)_2O)_2]_n$$

and substitute the anion

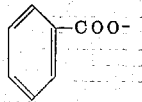

for the anion $CH_3COCHCOCH_3^-$ by direct reaction with

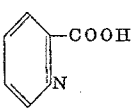

Thus 2.93 g. of $$[Cr(CH_3COCHCOCH_3)(OP(C_6H_5)_2O)_2]_n$$

is heated with 0.75 g. of

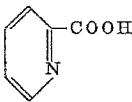

in o-dichlorobenzene at 180–183° C. until $$CH_3COCH_2COCH_3$$

is no longer evolved. There results a precipitate which after washing with petroleum ether and drying corresponds to

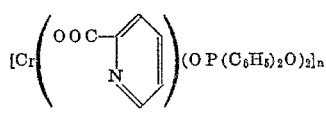

The dimer and other soluble lower homologs can be recovered from the o-dichlorobenzene filtrate by concentration of the filtrate and dilution with petroleum ether.

EXAMPLE 15

A mixture of 9.7 g. of

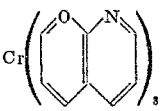

and 8.7 g. of $(C_6H_5)_2P(O)OH$ is heated at 100° C. under a pressure of 1–2 mm. Hg until 8-quinolinol is no longer evolved. The residue is washed first with benzene and then with chloroform to leave the polymer

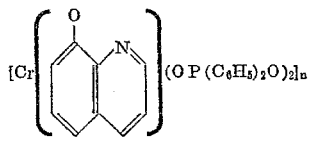

Soluble, lower molecular fractions are isolated by evaporation of the chloroform extract.

EXAMPLE 16

It is also possible to make the polymer of Example 15 by the method of Example 14. For this purpose 2.93 g. of $[Cr(CH_3COCHCOCH_3)(OP(C_6H_5)_2O)_2]_n$ is heated with 0.73 g. of 8-quinolinol in o-dichlorobenzene at 180–183° C. until $CH_3COCH_2COCH_3$ is no longer evolved. The precipitate consists of the polymer

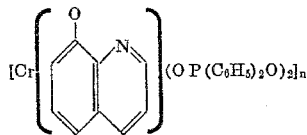

and addition of petroleum ether to the filtrate causes lower molecular weight homologs to precipitate.

EXAMPLE 17

Another procedure for the preparation of the polymer of Example 15 is the direct reaction of the polymer $[Cr(CH_3COCHCOCH_3)(OP)C_6H_5)_2O)_2]_n$ with 8-quinolinol in order to substitute the 8-quinolinolate anion for the $CH_3COCHCOCH_3^-$ anion. A mixture of 1.5 g. of $$[Cr(CH_3COCHCOCH_3)(OP(C_6H_5)_2O)_2]_n$$

and 2.0 g. of 8-quinolinol is heated to drive off $$CH_3COCH_2COCH_3$$

Some 8-quinolinol sublimes during the heating. The residue is then extracted with acetone leaving the insoluble polymer

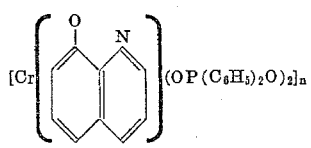

EXAMPLE 18

In a fusion reaction similar to Example 3, 6.99 g. of $$Cr(CH_3COCHCOCH_3)_3$$

and 6.24 g. of $CH_3(C_6H_5)P(O)OH$ are heated at 170° C. until $CH_3COCH_2COCH_3$ is no longer evolved. A similar workup of the residue yields soluble fractions of lower molecular weight polymeric $$[Cr(CH_3COCHCOCH_3)(OP(CH_3)(C_6H_5)O)_2]_n$$

as well as the insoluble polymer.

EXAMPLE 19

The process of Examples 3 and 18 is unsuitable for the preparation of $$[Cr(CH_3COCHCOCH_3)(OAs(CH_3)_2O)_2]_n$$

so an alternative procedure is used. A solution of 3.0 g. of $CrCl_3$ in ethanol is treated with a solution of 9.63 g. $AgNO_3$ in ethanol, and the precipitated AgCl is filtered off. Then a solution of 5.2 g. of $(CH_3)_2As(O)OH$ and 0.87 g. of Na in ethanol is added, followed by a solution of 1.9 g. of $CH_3COCH_2COCH_3$ and 0.44 g. of Na in ethanol. The resulting precipitate is filtered off, washing with water and then with chloroform to leave the polymer $$[Cr(CH_3COCHCOCH_3)(OAs(CH_3)_2O)_2]_n$$

Again, soluble, lower molecular weight polymers are recovered from the chloroform.

EXAMPLE 20

Example 19 is repeated with 3.6 g. of $(CH_3)_2P(O)OH$ substituted for the 5.2 g. of $(CH_3)_2As(O)OH$. The insoluble polymer $$[Cr(CH_3COCHCOCH_3)(OP(CH_3)_2O)_2]_n$$

is formed along with some soluble lower molecular weight fractions.

EXAMPLE 21

Example 18 is repeated with 10.49 g. of $$(C_6H_5)_2As(O)OH$$

substituted for the 6.24 g. of $CH_3(C_6H_5)P(O)OH$. The insoluble polymer $$[Cr(CH_3COCHCOCH_3)(OAs(C_6H_5)_2O)_2]_n$$

is formed along with some soluble lower molecular weight fractions.

EXAMPLE 22

The fusion of 10.47 g. of $Cr(CH_3COCHCOCH_3)_3$ with 7.32 g. of $C_6H_5COOH$ liberates $CH_3COCH_2COCH_3$. Extracting the ground residue with benzene yields a soluble fraction corresponding to $$[Cr(CH_3COCHCOCH_3)_2(OCC_6H_5O)]_2$$

and an insoluble fraction corresponding to $$[Cr(CH_3COCHCOCH_3)(OCC_6H_5O)_2]_n$$

Found for the soluble fraction: 14.1% Cr, 54.1% C. and 5.1% H; calculated for the dimer: 14.00% Cr, 54.99% C, and 5.16% H. Found for the insoluble fraction: 13.7% Cr, 53.9% C and 4.1% H; calculated for the polymer: 13.22% Cr, 58.02% C and 4.36% H.

EXAMPLE 23

A mixture of 10.95 g. of $In(CH_3COCHCOCH_3)_3$ and 8.73 g. of $(C_6H_5)_2P(O)OH$ is heated at 250° C. until $CH_3COCH_2COCH_3$ is no longer evolved. The residue is then extracted successively with ethanol, benzene, and chloroform to leave the insoluble polymer $$[In(CH_3COCHCOCH_3)(OP(C_6H_5)_2O)_2]_n$$

Lower molecular weight fractions are recovered from the benzene and chloroform.

EXAMPLE 24

Example 23 is repeated with 7.06 g. of $$Fe(CH_3COCHCOCH_3)_3$$

in place of the $In(CH_3COCHCOCH_3)_3$ and 6.24 g. of $CH_3(C_6H_5)P(O)OH$ in place of the $(C_6H_5)_2P(O)OH$. The reaction is carried out at 90° to 100° C. and at 2 mm. Hg pressure. The insoluble product is the polymer $$[Fe(CH_3COCHCOCH_3)(OP(CH_3)(C_6H_5)O)_2]_n$$

The soluble products are lower molecular weight homologs.

EXAMPLE 25

Example 15 is repeated with 9.2 g. of

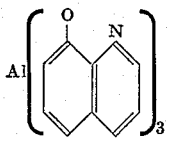

The insoluble polymer

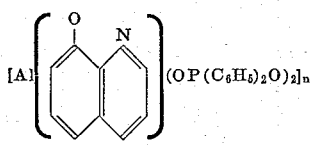

and soluble lower molecular weight homologs are recovered from the reaction product.

In similar fashion, Example 12 may be repeated with other ligands such as a glycine, (aminomethyl)phenylphosphinic acid

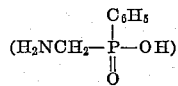

(diphenylphosphinylmethyl)phenylphosphinic acid

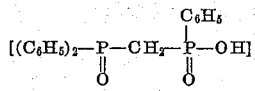

ethanolamine, phenylbiguanide, and benzoylacetone, and polymers are obtained which have high thermal stability.

It will be understood that numerous changes and variations may be made from the above description and examples without departing from the spirit and scope of the invention.

We claim:

1. A polymer having an inorganic backbone, said backbone consisting of a doubly bridged trivalent octahedral metal coordinated with a bidentate ligand which is an ion with a charge of −1 capable of forming an essentially strain-free ring with said octahedral metal and wherein said bridging group is the anion of an acid selected from the group consisting of organic carboxylic acids of the formula R′COOH where R′ is selected from the group consisting of alkyl and aryl and acids of structure $R_2M'(Y)YH$ where R is a member of the group consisting of hydrocarbon alkyl and aryl radicals containing from one to ten carbon atoms, M′ is an element selected from Group VB having an atomic number greater than 7 and Y is an atom selected from the group consisting of oxygen and sulfur.

2. A polymer having an inorganic backbone, said backbone consisting of a doubly bridged trivalent octahedral metal coordinated with a bidentate ligand wherein each of said bridging groups is the anion of an acid $$R_2M'(Y)YH$$

where R is a member of the group consisting of hydrocarbon alkyl and aryl radicals containing from one to ten carbon atoms, M′ is an element selected from Group VB having an atomic number greater than 7, Y is an atom selected from the group consisting of oxygen and sulfur, and said bidentate ligand is an anion with a charge of −1 capable of forming an essentially strain-free ring with said octahedral metal.

3. The polymer of claim 2 wherein the octahedral metal is chromium.

4. The polymer of claim 2 wherein the octahedral metal is iron.

5. The polymer of claim 2 wherein the octahedral metal is aluminum.

6. A polymer having an inorganic backbone, said backbone consisting of a doubly bridged chromium atom coordinated with a bidentate ligand with a charge of −1 capable of forming an essentially strain-free ring with said chromium atom, said bridging groups consisting of the anion $R_2P(O)OH$ where R is a member of the group consisting of hydrocarbon alkyl and aryl radicals containing from one to ten carbon atoms.

7. A polymer as in claim 6 wherein the bidentate ligand is the anion derived from acetylacetone.

8. A polymer as in claim 6 wherein the bidentate ligand is the anion derived from picolinic acid.

9. A polymer as in claim 6 wherein the bidentate ligand is the anion derived from acetylacetone and the R radical is phenyl.

10. A polymer as in claim 6 wherein the bidentate ligand is the anion derived from acetylacetone and the bridging groups are anions of methyl phenyl phosphinic acid.

11. A polymer insoluble in organic hydrocarbon solvents having an inorganic backbone, said backbone consisting of a doubly bridged chromium atom coordinated with the ion derived from acetylacetone wherein said bridging groups consist of the anion of $R_2P(O)OH$ where R is a member of the group consisting of hydrocarbon alkyl and aryl radicals containing from one to ten carbon atoms.

12. A polymer as in claim 11 wherein the bridging groups are the anions of diphenylphosphinic acid.

13. A polymer as in claim 11 wherein the bridging groups are the anions of methylphenyl phosphinic acid.

14. A polymer as in claim 1 wherein the bidentate ligand is the anion derived from acetylacetone and the bridging group is the anion of benzoic acid.

15. A process for making novel polymers having a spiral inorganic backbone which comprises mixing 1 mole of a metal chelate of structure $M(AB)_3$ with 2 moles of an acid HX where M is a trivalent octahedral metal, AB is a bidentate ligand with a charge of −1 capable of forming an essentially strain-free ring with M and X is the anion of an acid capable of bridging said M atoms selected from the group consisting of organic carboxylic acids of the formula R′COOH where R′ is selected from the group consisting of alkyl and aryl and acids of structure $R_2M'(Y)YH$ where R is a member of the group consisting of hydrocarbon alkyl and aryl radicals containing from one to ten carbon atoms, M′ is an element selected from Group VB having an atomic number greater than 7 and Y is an atom selected from the group consisting of oxygen and sulfur, and heating said mixture in an inert atmosphere to volatilize HAB.

16. A process for making novel polymers having a spiral inorganic backbone which comprises mixing 1 mole of a metal chelate of structure $M(AB)_3$ with 2 moles of an acid $R_2M'(O)OH$ where M is a trivalent octahedral metal, AB is a bidentate ligand with a charge of −1 capable of forming an essentially strain-free ring with M, R is a member of the group consisting of hydrocarbon alkyl and aryl radicals containing from one to ten carbon atoms and M' is an element selected from Group VB having an atomic number greater than 7, and heating said mixture in an inert atmosphere to volatilize HAB.

17. The process of claim 15 conducted in a high boiling liquid as a medium for the reaction.

18. The process of claim 15 conducted in a mixture of chlorinated biphenyls as a medium for the reaction.

References Cited by the Examiner

UNITED STATES PATENTS

| | | | |
|---|---|---|---|
| 2,786,733 | 3/57 | Thomson et al. | 260—2 |
| 2,925,430 | 2/60 | Stedehouder et al. | 260—2 |
| 3,002,986 | 10/61 | Hyde | 260—2 |
| 3,035,019 | 5/62 | Pluiber | 260—2 |
| 3,053,804 | 9/62 | Caldwell et al. | 260—2 |

MURRAY TILLMAN, *Primary Examiner.*

JOSEPH R. LIBERMAN, *Examiner.*

UNITED STATES PATENT OFFICE
CERTIFICATE OF CORRECTION

Patent No. 3,197,436                              July 27, 1965

Burton Peter Block et al.

It is hereby certified that error appears in the above numbered patent requiring correction and that the said Letters Patent should read as corrected below.

Column 2, lines 29 and 30, the formula should appear as shown below instead of as in the patent:

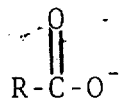

column 5, line 25, for "$A_I$" read -- Al --; column 6, line 2, for "$(C_5H_5)$" read -- $(C_6H_5)$ --; column 10, line 31, for "washing" read -- washed --.

Signed and sealed this 15th day of February 1966.

(SEAL)
Attest:

ERNEST W. SWIDER                        EDWARD J. BRENNER
Attesting Officer                      Commissioner of Patents